P. A. RASMUS.
AUTOMATIC AUTOMOBILE TURN TABLE.
APPLICATION FILED NOV. 25, 1910.
984,967.
Patented Feb. 21, 1911.
2 SHEETS—SHEET 1.
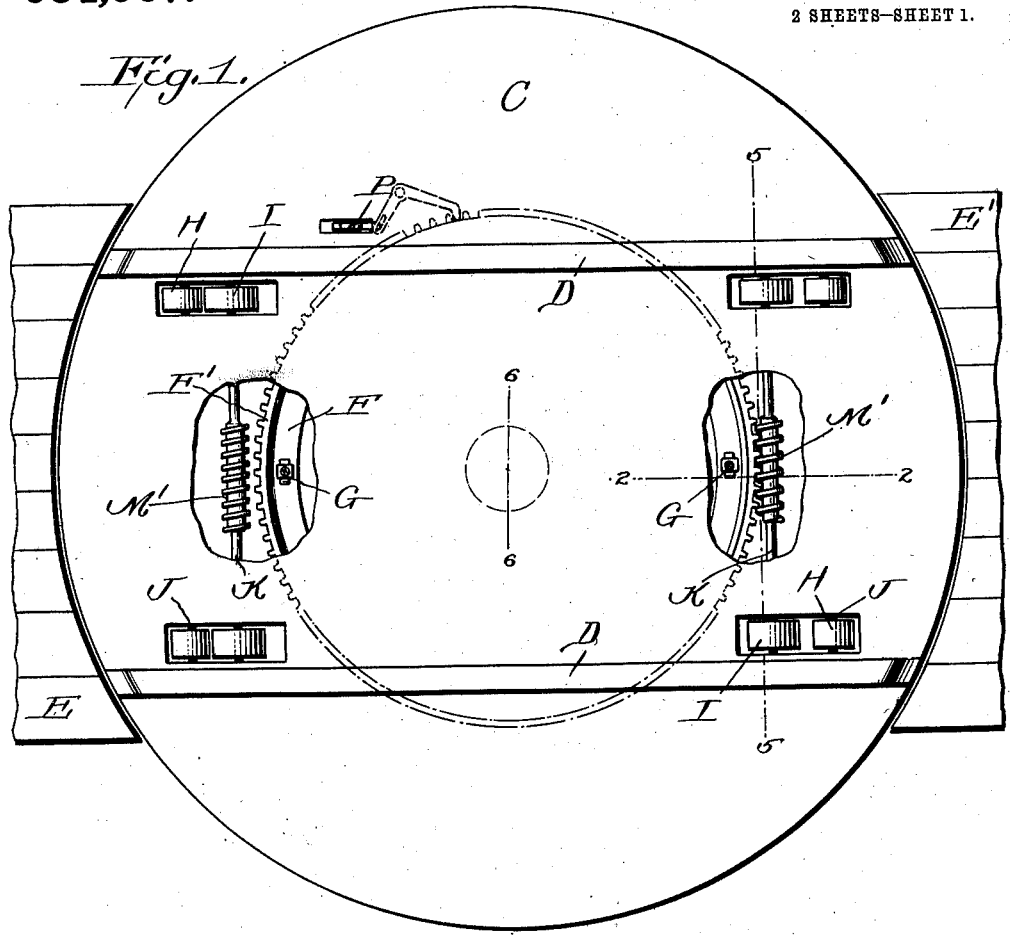
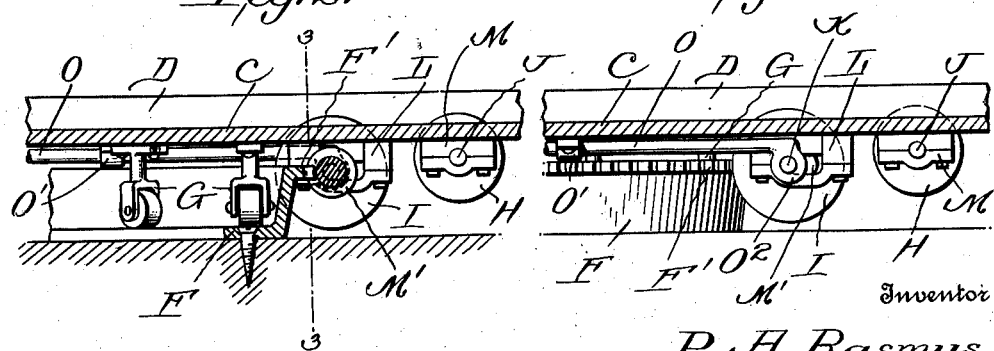
Witnesses
Olwin W. Holmes
A. Albright
Inventor
P. A. Rasmus
By Schneider & Schneider
Attorneys P. A. RASMUS.
AUTOMATIC AUTOMOBILE TURN TABLE.
APPLICATION FILED NOV. 25, 1910.
984,967.
Patented Feb. 21, 1911.
2 SHEETS—SHEET 2.
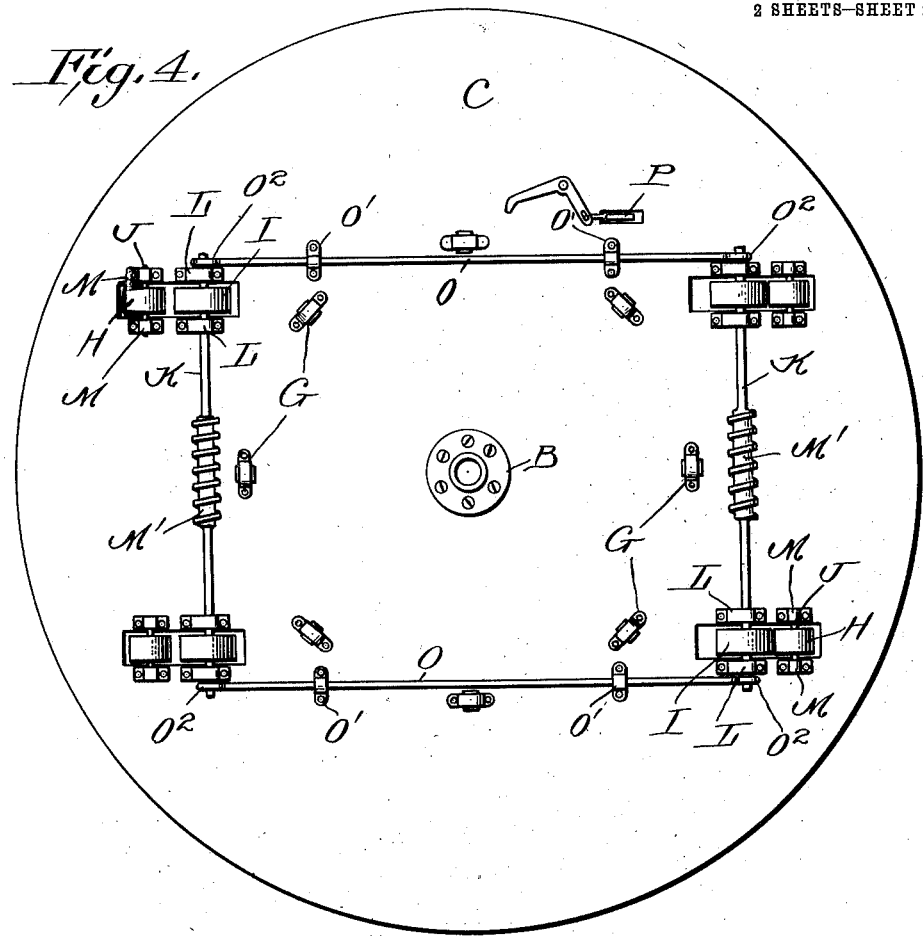
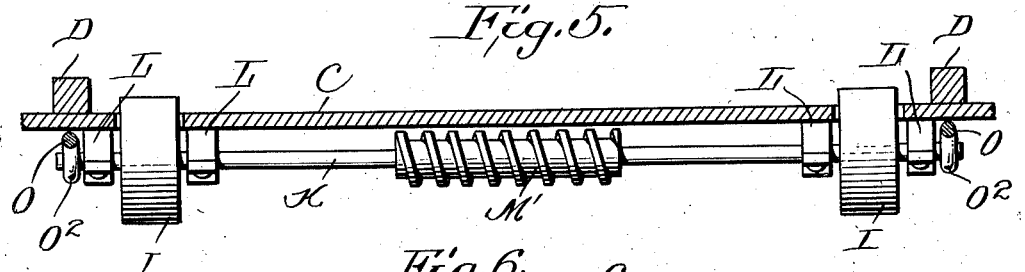
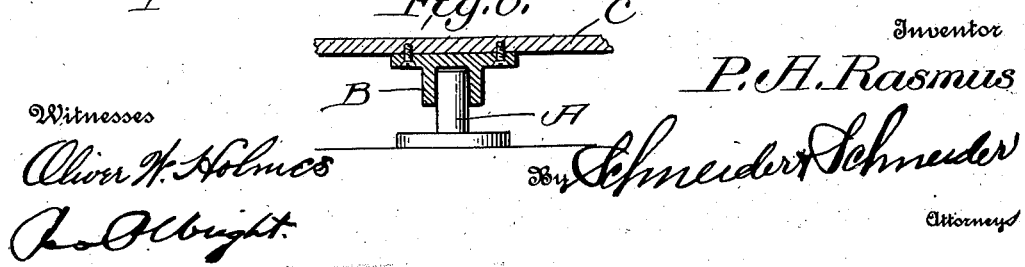

UNITED STATES PATENT OFFICE.

PETER A. RASMUS, OF PAXTON, ILLINOIS.

AUTOMATIC AUTOMOBILE TURN-TABLE.

984,967.      Specification of Letters Patent.    Patented Feb. 21, 1911.

Application filed November 25, 1910. Serial No. 594,184.

*To all whom it may concern:*

Be it known that I, PETER A. RASMUS, a citizen of the United States, residing at Paxton, in the county of Ford and State of Illinois, have invented a new and useful Improvement in Automatic Automobile Turn-Tables, of which the following is a specification.

This invention relates to certain new and useful improvements in automobile turn-tables, the object being to provide an automatic turntable in which the power for operating the same is derived from the wheels of the automobile when the automobile is in position thereon.

A still further object of my invention is to provide a turntable which is exceedingly simple and cheap in construction, and one which is especially adapted to be used in public and private garages or any other place where it is desired to turn the automobile partially or wholly around in a limited space.

A still further object of my invention is to provide a turntable in which the operating mechanism is thrown into gear by the machine passing upon the same, in such a manner that the power for driving the turntable will be derived from the wheels of the automobile in such a manner that the turntable can be turned without the driver of the machine leaving his seat.

Another object of my invention is to provide a brake in connection with the turntable, whereby the same can be stopped at any desired point, the brake being so arranged upon the turntable that the same can be readily operated by the driver of the machine without leaving his seat.

A still further object of my invention is to provide novel means for revolving the turntable, which comprises a pair of worm gears slidably mounted upon opposite sides of a centrally arranged gear in such a manner that one of said worm gears will be thrown into mesh with said gear, and the other thrown out of mesh, whereby the gear out of mesh will be thrown into mesh by the next automobile passing upon the turntable after the first machine has passed off of the same.

With these objects in view, the invention consists in the novel features of construction, combination and arrangements, of parts hereinafter fully described and pointed out in the claims.

In the drawing forming a part of this specification:—Figure 1 is a top plan view partly broken away of my improved automatic turntable showing the operating mechanism in the position it assumes when a machine is upon the same ready to be turned. Fig. 2 is a section taken on line 2—2 of Fig. 1. Fig. 3 is a section taken on line 3—3 of Fig. 2. Fig. 4 is an inverted plan view of the turn table. Fig. 5 is a section taken on line 5—5 of Fig. 1, and Fig. 6 is a section taken on line 6—6 of Fig. 1.

In carrying out my improved invention, I employ a bearing pin A which is secured to the floor of the garage at the desired point, and on which is mounted a cup shaped bearing B secured centrally to the under side of a circular turntable C which can be formed of any suitable material, and is provided with spaced guard rails D for guiding the machine in position thereon. Arranged at opposite points on the table are gang planks E E', and while I have only shown a pair of these gang planks, it is of course understood that a table could be entirely surrounded by the same in order to allow the machine upon the same to pass off after being turned only partly around.

Secured to the floor under the table C is a ring F having an upwardly projecting flange provided with a lateral toothed portion F' forming an annular gear for the purpose later described. The ring F is secured to the floor by any suitable means, and forms a track for casters G carried by the table C in order to support the table firmly, in such a manner that the same can rotate freely the central pin and cup A and B forming means for holding the table in order to prevent the same from moving in any way. By this construction the turntable can be rotated very easily and in such a manner that all danger of the same getting out of order when in operation is prevented. While I have shown casters for supporting the table, it of course is being understood that various other means could be employed without departing from the spirit of my invention.

The table C is provided with spaced slots between the guard rails D through which extend rollers H and I which are carried by shafts J and K mounted in suitable bearings L and M secured to the under side of the table adjacent the slots, and the bearings L allow the shafts to have a sliding and revoluble movement for the purpose desired. The rollers H are idle rollers and the rollers I form power rollers which are fixed to the shafts K in such a manner that when the drive wheels of the automobile pass upon said rollers, the rollers will be forced away from the idle rollers and be rotated by the drive wheels of the automobile. The shafts K connect the respective power rollers I, and are provided with worm gears M' adapted to mesh with the annular gear F' of the ring F in such a manner that the turntable will be rotated by the worm gears when the power rollers are revolved.

The shafts K carrying the worm gears and power rollers are connected together by slidably mounted bars O which are mounted in suitable bearings O' secured to the under side of the turntable, and the ends of said bars are provided with bearings O² to receive the ends of the respective shafts K in such a manner that when one of the worm gears is forced into engagement with the annular gear, the other will be forced out of engagement so that when the table is oscillated by the worm gear in mesh, the other worm gear will be in such a position that when an automobile passes upon the turntable it will be forced into engagement and the other disengaged. By this arrangement one of the worm gears is always in mesh and the other out of mesh ready to be thrown into mesh by the automobile.

In order to provide means for stopping the turntable at the desired point and to prevent the same from moving until the driver of the machine is ready, I provide a brake P, the hand lever of which extends out through the turntable into such a position that it can be readily grasped by the driver of the machine without leaving his seat, and it will be seen that by this construction the driver after passing upon the platform releases the brake and power of the driving wheels of the machine which operated the worm gear so as to cause the worm gear to rotate.

What I claim is:—

1. A turntable having gearing for operating the same driven by the wheels of the vehicle, said gearing being thrown into operation and out of operation by the vehicle passing upon the same.

2. A turntable having means for driving the same, said means being thrown into and out of operation by the vehicle passing upon the same.

3. A revoluble turntable for automobiles having means for driving the same thrown into operation and operated by the vehicle passing upon the same and out of operation by the vehicle passing off of the turn table.

4. The combination with a revolubly mounted platform, of a fixed gear arranged under said platform, worm gears co-acting with said gears, and means operated by the vehicle passing upon the platform for moving one of said worm gears into engagement with said fixed gear and rotating said gear.

5. An automatic turntable comprising a revoluble platform, an annular gear arranged under said platform, revolubly and slidably mounted worm gears co-acting with the opposite sides of said fixed gear, and means operated by the passage of a vehicle upon said platform for throwing one of said worm gears into mesh with the fixed gear and rotating the same and disengaging the other worm gear.

6. In an automatic table, the combination with an automatic platform, of a fixed gear arranged under said platform, a revolubly and slidably mounted worm gear co-acting with said fixed gear, and means operated by the passage of a vehicle upon said platform for throwing said worm gear into engagement with the fixed gear and rotating the same.

7. In an automatic turntable, the combination with a fixed annular gear, of a table revolubly mounted over said gear provided with spaced slots, a fixed and a movable roller mounted in each of said slots, a worm gear operated by the movable rollers, said worm gear being adapted to be thrown into engagement with the fixed gear by the passage of a vehicle upon said platform.

8. A turntable for motor vehicles comprising a revolubly mounted table having spaced slots and guard rails, a gear fixed under said turntable, fixed and movable rollers arranged in said slots, shafts carrying the movable rollers provided with worm gears, bars connecting said shafts, one of said worm gears being thrown into engagement with the fixed gear and rotated by the motor vehicle when on said platform, and a brake for stopping said turntable.

9. A turntable for automobiles, comprising a central bearing pin, a table provided with a cup mounted on said bearing pin, a fixed ring arranged under said table provided with a gear, casters carried by the table traveling on said ring, guard rails mounted on the top of said table, said table being provided with spaced slots between said guard rails, idle rollers mounted in the outer ends of said slots, drive rollers mounted in the inner ends of said slots, shafts carrying said drive rollers, worm gears carried by said shafts adapted to mesh with the fixed gear, a brake carried by said table having a lever extending upwardly therefrom, said power rollers being adapted to be operated by the drive wheels of the motor vehicle passing upon the same so as to throw one of said worm gears into engagement with the fixed gear and the other out of engagement, the worm gear in engagement being adapted to be rotated by the drive wheels of the motor vehicle.

PETER A. RASMUS.

Witnesses:
G. G. GATES,
G. W. KARR.